Nov. 22, 1949  L. H. KNIBB  2,488,668
ICE CREAM FREEZER
Filed Feb. 15, 1946

INVENTOR
Leroy H. Knibb
BY
R. H. Holbrook
ATTORNEY

Patented Nov. 22, 1949

2,488,668

UNITED STATES PATENT OFFICE 2,488,668

ICE-CREAM FREEZER

Leroy H. Knibb, Sabot, Va.

Application February 15, 1946, Serial No. 647,705

8 Claims. (Cl. 62—114)

My present invention relates to an ice cream freezer adapted for use in standard types of domestic refrigerating units. The freezer involves a container equipped with an agitator or dasher operated by an electric motor which is preferably detachably mounted upon the container by means of low thermal conductivity to minimize heat transfer from the motor to the container.

My invention further involves a fan operated by the motor and so disposed relative to the container and the motor as to dissipate the heat resulting from the temperature rise of the motor and thereby minimize heat transfer from the motor to the container and its contained edible. This action is particularly advantageous in reducing the time required for the production of ice cream and similar frozen edibles in the container.

I will describe my invention by reference to the accompanying drawings illustrating preferred embodiments thereof, and other objects of my invention will appear as the description proceeds.

Figure 1:
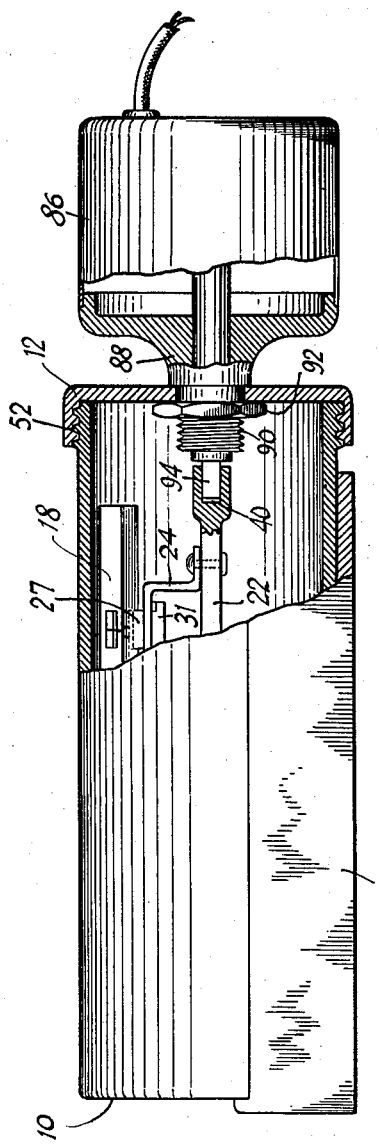
Fig. 1 shows one embodiment of my invention in side elevation partly broken away to disclose parts of the mechanism in section.

The container for either embodiment of my invention involves a cylindrical receptacle 10 adapted to be disposed within a refrigerator ice compartment with its longitudinal axis in horizontal position. The end of the container is normally closed by a detachable cover, 12 or 14, preferably screw threaded upon the receptacle, and constructed of material of low thermal conductivity.

The receptacle cover centrally supports a shaft connection for rotating a dasher mechanism disposed within the container. This mechanism involves agitators and container wall scrapers 18 and 20, secured to the central rod or shaft 22 by brackets 24 and 26. This mechanism also includes connectors 27—30 fixed to the scrapers and loosely disposed within openings within the brackets. T head extensions 31—38 on the connectors maintain the scrapers operatively joined to the brackets, and permit the scrapers to have a modicum of free movement necessary to the effective operation of the freezer.

The right hand end of the dasher rod or bar 22 is formed with a slot or socket 40 to receive the co-acting tongue of a shaft connection extending through the container cover to transmit rotary motion to the dasher.

Each embodiment of my invention has a heavy base 42 secured thereto. This base has a flat bottom for extended surface contact with the bottom of a refrigerator ice compartment, and its weight functions to stabilize the freezer during its operation. It is also of high thermal conductivity in order to promote the cooling and freezing of the edible contents of the freezer.

Figure 2:
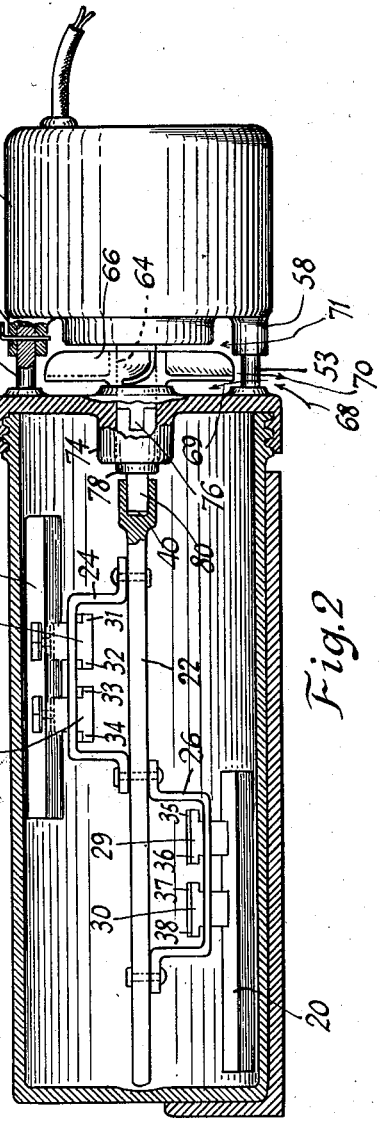
Fig. 2 is a longitudinal vertical section of another embodiment of my invention.
Figure 3:
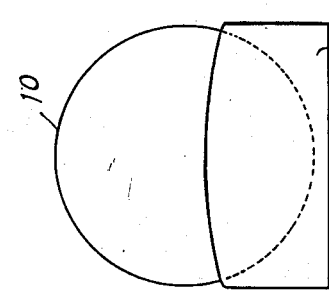
Fig. 3 is an end elevation of either embodiment, showing the relationship of the container and its base.

The cover 14 of the Fig. 2 embodiment is screw-threaded on the end of the receptacle as indicated at 50, and the cover 12 is similarly secured to the end of the receptacle as indicated at 52.

The cover 14 has fixed thereto studs of low thermal conductivity. There are preferably three or more studs but only two are shown at 53 and 54 in Fig. 2. They extend from the cover 14 in a direction parallel to the longitudinal axis of the container and are adapted to be freely received in the sockets of correspondingly spaced studs 56 and 58 which are rigid with the electric motor frame or casing 60.

One or more of the studs on the cover are provided with transverse openings aligned with similar openings in the corresponding motor stud to receive a pin or pins 62 for locking the motor upon the container cover.

The motor shaft 64 has a fan 66 fixed thereon and normally disposed within the space between the motor and the cover, as clearly shown in Fig. 2. The motor operates to create heat dissipating air currents as indicated by the arrows 68—71 to minimize the transfer of heat from the motor to the container.

The end of the motor shaft projecting beyond the fan 66 is received within an opening in the hub 74 of the cover 14, and it has a tongue 76 normally fitting within a socket or opening in the shaft connection 78. This element is rotatably mounted within the hub 14 and has a tongue 80 in operative connection with the dasher rod 22, being received within the socket 40.

The frame or casing 86 of the electric motor of the Fig. 1 embodiment has an extension 88 of low thermal conductivity. This extension has a screw-threaded reduced end 90 extended through the cover 12 and secured rigidly thereon by the tightening of the nut 92 against the inside of the cover. A tongue 94 received within the socket 40 of the rod 22 serves as a detachable drive connection between the motor shaft 94 and the dasher.

Whereas, in conformance with the Federal

Statutes, the invention has been described with reference to a specific embodiment, it is to be understood that the invention is not limited to all of the details thereof, but, rather, that the invention is of a scope commensurate with the scope of the subjoined claims.

I claim as my invention:

1. In an ice cream freezer for use in a domestic refrigerator, a freezing container to be inserted in the ice making compartment of the refrigerator, a container base of high thermal conductivity, a dasher normally disposed within the container, an electric motor adapted for direct connection to the dasher, and means detachably associating the motor and the container and including a part of low thermal conductivity functionally disposed between the motor and the container in a readily accessible position to facilitate the removal of the motor from the container.

2. In freezer for use in a domestic refrigerator, a freezing container adapted to be inserted in the ice making compartment of the refrigerator, the container being mounted on a base of high thermal conductivity, a dasher normally rotatably mounted within the container, a motor normally directly connected to the dasher, and means detachably associating the motor and the container and including a container cover and a motor extension of low thermal conductivity, said extension being secured to said cover.

3. An ice cream freezer adapted to be inserted in the ice making compartment of the evaporator of a domestic refrigerator comprising a container of the cylindrical type, dasher means in the container, a detachable end cover normally closing the end of the container and constructed of material of low heat conductivity, an electric motor, a fan unitarily associated with the motor, and means detachably supporting the motor and fan unit on the cover with the fan operable to create heat dissipating air currents between the cover and the motor, the cover having extending centrally therethrough a detachable shaft connection operatively associating the dasher and the motor.

4. A freezer adapted to be inserted in the ice making compartment of the evaporator of a domestic refrigerator comprising a container, rotatable dasher means in the container, a detachable end cover normally closing the end of the container and constructed of material of low heat conductivity, an electric motor, a fan fixed to the motor shaft, and means detachably supporting the motor and fan unit on the cover with the fan disposed between the motor and the cover to create heat dissipating air currents between the cover and the motor, the cover having extending therethrough a detachable shaft connection operatively associating the dasher and the motor.

5. An ice cream freezer adapted to be inserted in the ice making compartment of the evaporator of a domestic refrigerator comprising a container of the cylindrical type, a flat base of high thermal conductivity normally supporting the container, dasher means in the container, a detachable end cover normally closing the end of the container and constructed of material of low heat conductivity, an electric motor, a fan fixed to the motor shaft, and separable stud connections detachably supporting the motor and fan unit on the cover with the fan operable to create heat dissipating air currents between the cover and the motor, the cover having extending therethrough a detachable shaft connection operatively associating the dasher and the motor.

6. In a freezer for use in a domestic refrigerator, a freezing container to be inserted in the ice making compartment of the refrigerator, a container base of high thermal conductivity, a dasher normally disposed within the container, an end cover detachably associated with the container and constructed of material of low heat conductivity, an electric motor adapted for direct connection through the cover to the dasher, and means including a motor extension of low thermal conductivity extending through the cover and detachably associating the motor and the container.

7. In a refrigerator freezer unit, an edible container adapted to fit in an ice tray space, a dasher in the container, a motor, readily detachable means normally securing the motor to the container and including an element of low thermal conductivity, and a fan fixed to the motor shaft and interposed relative to the container and motor to create heat dissipating air currents between the container and the motor, the dasher and motor being connected by shaft means extending through a wall of the container.

8. In a refrigerator freezing unit, an edible container, a rotatable dasher therein, a motor detachably secured to the container, a container end cover of low thermal conductivity, means connecting the motor and the dasher and extending through the cover, and a fan fixed to the motor shaft and positioned intermediate the container and the motor, the container and motor being spaced for admitting air directly to the fan, the motor and fan being supported on the end cover by stud connections of low heat conductivity.

LEROY H. KNIBB.

REFERENCES CITED

The following references are of record in the file of this patent:

UNITED STATES PATENTS

| Number | Name | Date |
|---|---|---|
| 2,020,946 | Jordan | Nov. 12, 1935 |
| 2,167,879 | Des Roches | Aug. 1, 1939 |
| 2,416,326 | Knibb | Feb. 25, 1947 |